(No Model.)
J. M. FORD.
BALE FASTENER.
No. 435,218. Patented Aug. 26, 1890.
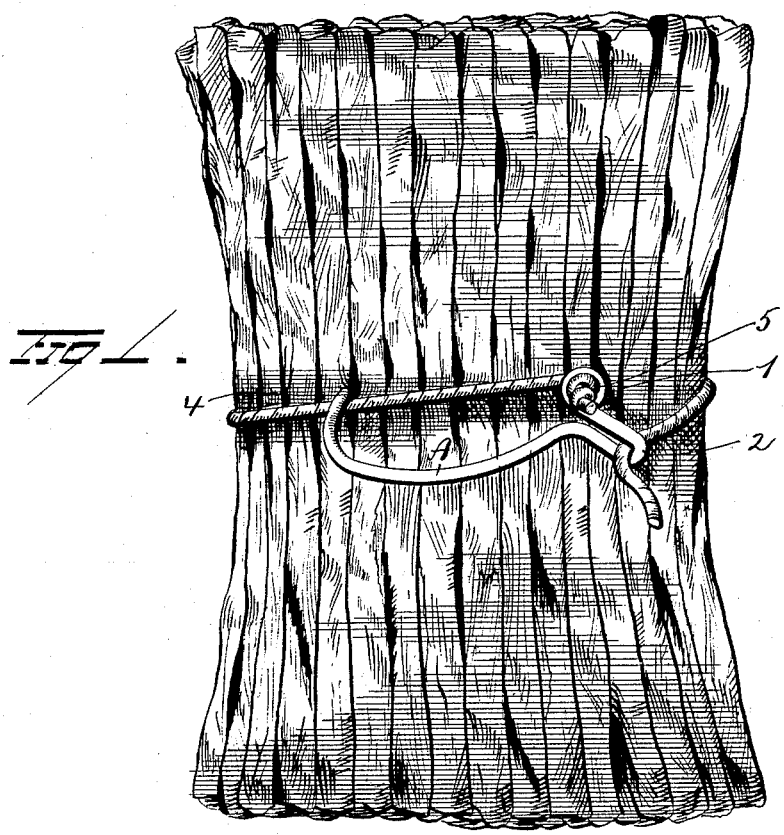
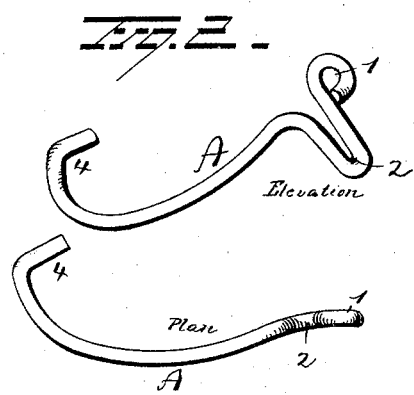

UNITED STATES PATENT OFFICE.

JOHN M. FORD, OF ASHLAND, OHIO.

BALE-FASTENER.

SPECIFICATION forming part of Letters Patent No. 435,218, dated August 26, 1890.

Application filed February 25, 1890. Serial No. 341,658. (No model.)

*To all whom it may concern:*

Be it known that I, JOHN M. FORD, of Ashland, in the county of Ashland and State of Ohio, have invented certain new and useful Improvements in Bale-Fasteners; and I do hereby declare the following to be a full, clear, and exact description of the invention, such as will enable others skilled in the art to which it appertains to make and use the same.

My invention relates to an improvement in bands and band-fasteners, the object being to provide a simple and inexpensive fastening capable of quick and easy application to bundles, and one requiring comparatively little material, and which may be quickly tightened or adjusted to the required size.

With this end in view my invention consists in certain novel features of construction and combinations of parts, as will be hereinafter described, and pointed out in the claim.

In the accompanying drawings, Figure 1 is a view in perspective of a bundle of fodder with my improved fastener applied thereto, and Fig. 2 is a detached view of the device.

A represents the shank of the fastener. The fastener is preferably made of wire and has an eyelet 1 at one end. Adjacent to this eyelet a U-shaped loop 2 is formed. From this point the wire is bent around in substantially the shape shown in the drawings, and it terminates in a hook 4. A piece of twine with a knot 5 in one end is passed through the eyelet 1, and after passing around the bundle and being drawn as tight as possible the other end is wedged into the U-shaped loop 2, where it is securely held or wedged. When the twine is thus fastened at its opposite ends in the eyelet and loop, the loop and eyelet are about in alignment with each other, and the shank extends out at about right angles to the twine. The outer end is then swung around and hooked over the twine or on the opposite side from the loop. This tightens the twine around the bundle, and not only makes a tight bundle, but a secure fastening, the fastening itself acting as a lever fulcrumed at the eyelet and knot. This band and fastener may be used for tying fodder, straw, horses' tails, &c., as found expedient.

It is evident that slight changes might be resorted to in the form and arrangement of the several parts described without departing from the spirit and scope of my invention; and hence I do not wish to limit myself to the exact construction herein set forth; but,

Having fully described my invention, what I claim as new, and desire to secure by Letters Patent, is—

A fastener for bundles, consisting, essentially, of a lever bent to form an eyelet at one end, a hook at the opposite end and a loop between the ends, and a band adapted to encircle a bundle, said band being passed through the eyelet and having a knot in one end which retains it in the eyelet, and the other end of the band adapted to be wedged in the loop, and the hook adapted to swing around on the band as an axis to engage the band, whereby the tension of the latter around the bundle is increased, substantially as set forth.

In testimony whereof I have signed this specification in the presence of two subscribing witnesses.

JOHN M. FORD.

Witnesses:
SAM. R. JONES,
J. D. JONES.